UNITED STATES PATENT OFFICE.

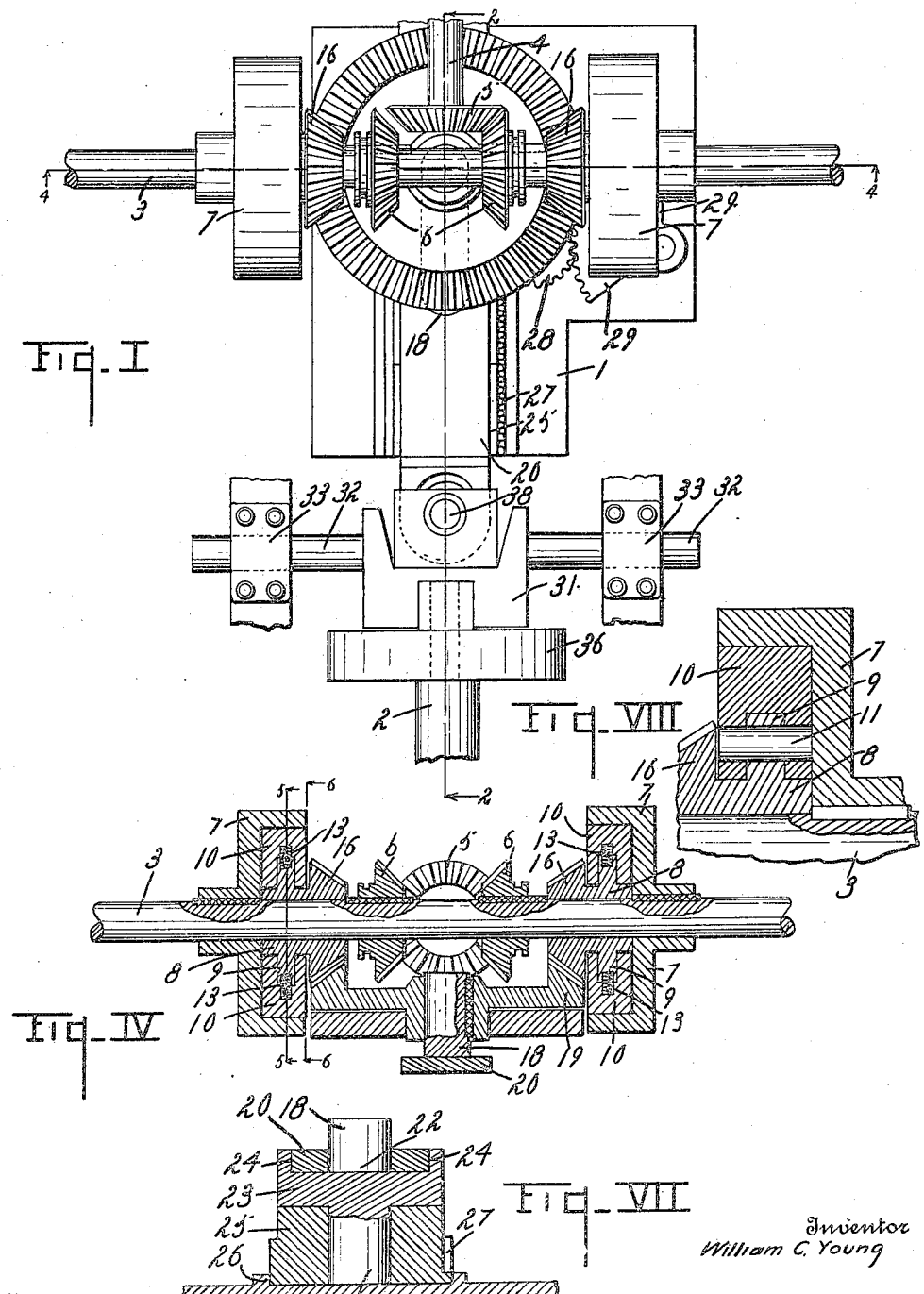

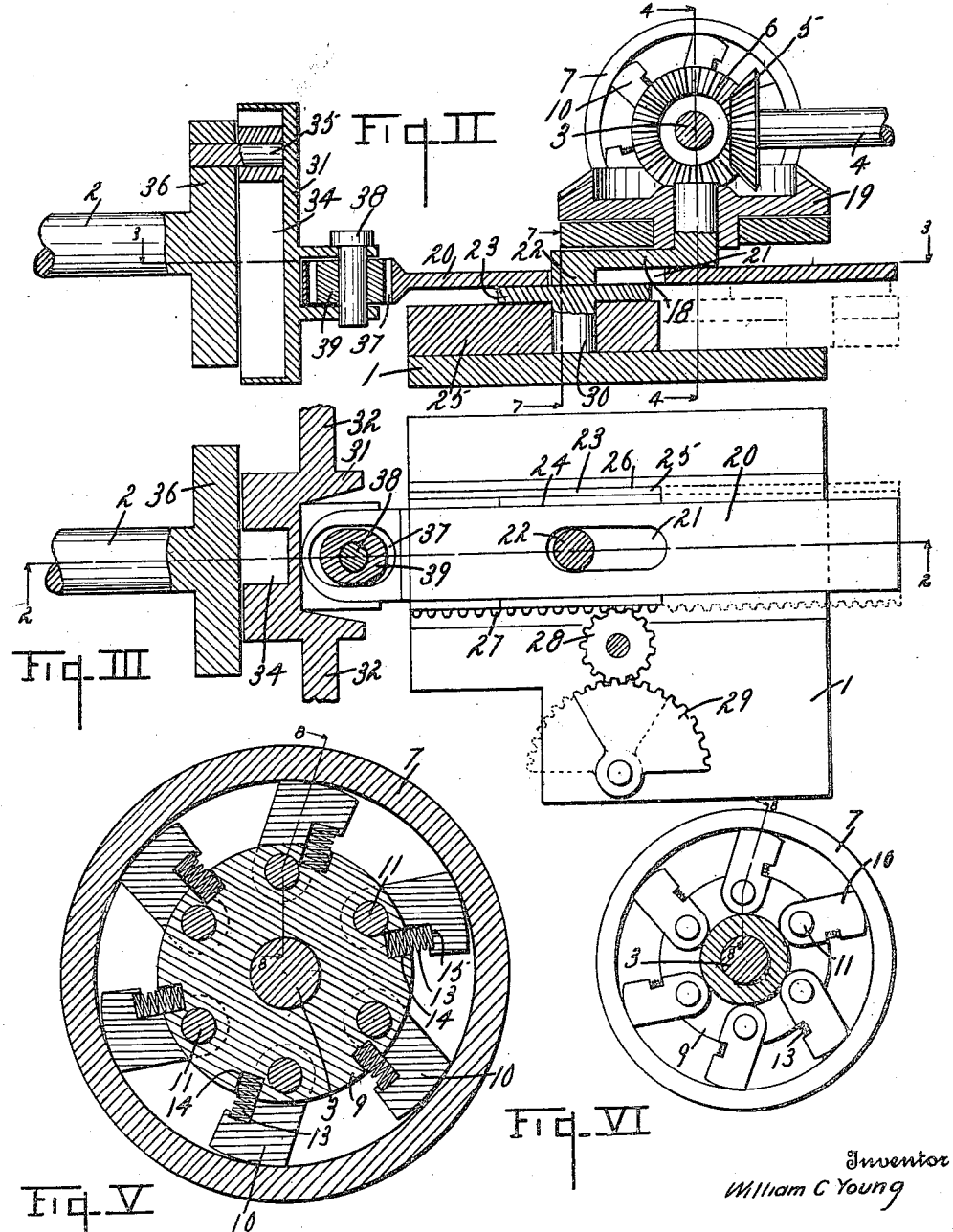

WILLIAM C. YOUNG, OF BATTLE CREEK, MICHIGAN.

MECHANICAL MOVEMENT OR DRIVING-GEARING.

1,259,703.   Specification of Letters Patent.   Patented Mar. 19, 1918.

Application filed October 16, 1917. Serial No. 196,839.

*To all whom it may concern:*

Be it known that I, WILLIAM C. YOUNG, a citizen of the United States, residing at Battle Creek, county of Calhoun, State of Michigan, have invented certain new and useful Improvements in Mechanical Movement or Driving-Gearing, of which the following is a specification.

This invention relates to a mechanical movement or driving gearing.

The main objects of this invention are:

First, to provide an improved mechanical movement or driving gearing whereby the driven member is rotated at various speeds from either a rotary or an oscillatory source of power.

Second, to provide an improved mechanical movement or driving gearing with convenient means for regulating the speed of the driven member.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail plan view of a structure embodying the features of my invention.

Fig. II is a detail section on a line corresponding to line 2—2 of Figs. I and III.

Fig. III is a detail section on a line corresponding to the broken line 3—3 of Fig. II.

Fig. IV is a detail section on a line corresponding to line 4—4 of Figs. I and II.

Fig. V is a detail section on a line corresponding to line 5—5 of Fig. IV, showing details of the clutch driving members.

Fig. VI is a detail section on a line corresponding to line 6—6 of Fig. IV, showing further details of the clutch driving members.

Fig. VII is a detail section on a line corresponding to line 7—7 of Fig. II, showing details of the speed regulating means.

Fig. VIII is an enlarged detail section on a line corresponding to the broken line 8—8 of Figs. V and VI, showing details of the clutch members.

In the drawing similar reference characters refer to similar parts throughout the several views, and the sectional views are taken looking in the direction of the little arrows at the ends of the section lines.

Referring to the drawing, the support or base 1, which is shown mainly conventionally, may be mounted as desired.

2 indicates the driving shaft and 3 the driven shaft.

Where it is desired to provide a reverse mechanism a reversing shaft 4 is provided and when present the power is delivered through it. This shaft 4 is provided with a driven reversing gear 5 with which either of the driving reversing gears 6 may be meshed, these gears being splined to the driving shaft. The means for shifting these gears are not illustrated.

A pair of driven clutch members 7 are keyed to the driven shaft 3. The driving clutch members 8 are rotatably mounted on the shaft 3. These driving clutch members are provided with annular flanges 9 on which the clutch jaws 10 are pivoted. The jaws are disposed so that they incline forwardly on their pivots 11 which insures their engaging when the driving clutch member is rotated forwardly relative to the driven clutch member and their disengagement when the driven clutch member is rotated forwardly relative to the driving clutch member.

The heel portions of the jaws are the engaging portions so that they release with a very slight relative movement of the clutch members. The coiled spring 13 arranged in seats 14 engage the shoulders 15 of the jaws to hold them yieldingly in engaging position. The jaws are oppositely disposed so that when the clutch members are driven alternately in opposite directions the driven shaft is driven continuously in the same direction.

The clutch members are provided with oppositely disposed beveled gears 16. A driving member 18 which, in the structure illustrated, is in the form of a crank, is provided with a beveled gear 19 coacting with the gears 16 so that when the driving member is oscillated the driving clutch members are actuated. An actuated lever 20 is provided. This actuating lever is longitudinally slotted at 21 to receive the wrist pin 22 on the driving member. The lever is supported by the fulcrum member 23 which is slotted or recessed at 24 to receive the same.

This fulcrum member is carried by a slide 25 mounted in the ways 26 on the base or support 1.

The slide is provided with a rack 27 with which the pinion 28 meshes, the pinion being actuated by the segment 29 provided with a suitable lever, not shown. By this means the fulcrum member may be adjusted to a neutral position, that is, to a position in which the fulcrum member pivot 30 is in alinement with the wrist pin 22 or moved longitudinally of the lever, thus regulating the throw of the driving member.

If the speed of the lever is maintained at a uniform rate the speed of the driven shaft may be varied from rest to the maximum by the adjustment of the fulcrum member.

The motion is transmitted from the driving shaft 2 to the lever through the crosshead 31 which is provided with slide arms 32 sliding in the bearings 33. The crosshead has a slot 34 transverse to the plane of its reciprocation engaged by the wrist pin 35 on the crank 36 of the driving shaft 2.

With the parts thus arranged, as the driving shaft rotates the crosshead is reciprocated and the lever actuated.

To accommodate for the oscillating movement of the crosshead the lever is slotted at 37 to receive the pin 38 which has a bearing 39 permitting limited movement.

My improved mechanical movement or variable speed gearing is advantageous for use in many relations. I have not attempted to illustrate or describe various adaptations thereof or the various modifications in structural details which I contemplate, as I believe the disclosure made will enable those skilled in the art to which my invention relates to embody or adapt the same as may be desired.

Having thus described my invention, what I claim as new and desire to secure by Letters Patent, is:

1. The combination of driving and driven shafts, driven clutch members rotatable with said driven shaft, driving clutch members rotatably mounted on said driven shaft to coact with said driven clutch members and provided with oppositely acting clutch jaws and with oppositely disposed beveled gears, a longitudinally slotted actuating lever, an oscillating driving crank member provided with a beveled driving gear meshing with said gears of said clutch members and with a wrist pin engaging said slot, a fulcrum member recessed to receive said lever and adjustable longitudinally thereof, an adjusting slide on which said fulcrum member is pivotally mounted, and a reciprocating crosshead driven by said driving shaft and operatively connected to said lever.

2. The combination of a driven shaft, driven clutch members rotatable with said shaft, driving clutch members rotatably mounted on said shaft to coact with said driven clutch members and provided with oppositely acting clutch jaws and with oppositely disposed beveled gears, a longitudinally slotted actuating lever, an oscillating driving crank member provided with a beveled driving gear meshing with said gears of said clutch members and with a wrist pin engaging said slot, a fulcrum member recessed to receive said lever and adjustable longitudinally thereof, an adjusting slide on which said fulcrum member is pivotally mounted.

3. The combination of a driven shaft, driven clutch members rotatable with said shaft, driving clutch members rotatably mounted on said shaft to coact with said driven clutch members and with oppositely disposed beveled gears, a longitudinally slotted actuating lever, an oscillating driving crank member provided with a beveled driving gear meshing with said gears of said clutch members and with a wrist pin engaging said slot, a fulcrum member recessed to receive said lever and adjustable longitudinally thereof, an adjusting slide on which said fulcrum member is pivotally mounted, and means for adjusting said slide to and from a position in which the fulcrum member pivot is in alinement with the wrist pin of said driving crank member.

4. The combination of driving and driven shafts, driven clutch members rotatable with said driven shaft, oppositely acting driving clutch members rotatably mounted on said driven shaft to coact with said driven clutch members and provided with gears, an oscillating driving crank member provided with a gear coacting with said gears of said clutch members to drive them alternately in the same direction, an actuating lever for said crank member, a fulcrum member for said lever adjustable longitudinally thereof, an adjusting slide on which said fulcrum member is mounted, and a reciprocating crosshead operatively connected to said lever and having driving connection with said driving shaft.

5. The combination of a driven shaft, driven clutch members rotatable with said shaft, oppositely acting driving clutch members rotatably mounted on said shaft to coact with said driven clutch members and provided with gears, an oscillating driving crank member provided with a gear coacting with said gears of said clutch members to drive them alternately in the same direction, an actuating lever for said crank member, a fulcrum member for said lever adjustable longitudinally thereof, and an adjusting slide on which said fulcrum member is mounted.

6. The combination of a driven shaft, driven clutch members rotatable with said shaft, oppositely acting driving clutch members rotatably mounted on said shaft to coact with said driven clutch members and provided with gears, an oscillating driving crank member provided with a gear coacting with said gears of said clutch members to drive them alternately in the same direction, an actuating lever for said crank member, a fulcrum member for said lever adjustable longitudinally thereof, an adjusting slide on which said fulcrum member is pivotally mounted, and means for adjusting said slide to and from a position in which the fulcrum member pivot is in alinement with the wrist pin of said driving crank member.

7. The combination of driving and driven shafts, driven clutch members rotatable with said driven shaft, driving clutch members rotatably mounted on said driven shaft to coact with said driven clutch members and provided with oppositely acting clutch jaws and with oppositely disposed beveled gears, an oscillating driving member provided with a beveled driving gear meshing with said gears of said clutch members, an actuating lever therefor, a fulcrum for said lever adjustable to regulate the stroke of the driving member, and a reciprocating crosshead having a crank pin slot transverse to its path of reciprocation and a pin and slot connection with said actuating lever, said driving shaft being provided with a crank having a wrist pin engaged in said crosshead slot.

8. The combination of a driven shaft, driven clutch members rotatable with said shaft, driving clutch members coacting with said driven clutch members and provided with oppositely acting clutch jaws and with oppositely disposed beveled gears, an oscillating driving member provided with a beveled driving gear meshing with said gears of said clutch members, an actuating lever therefor, and a fulcrum for said lever adjustable to regulate the stroke of the driving member.

9. The combination of driving and driven shafts, driven clutch members rotatable with said driven shaft, oppositely acting driving clutch members rotatably mounted on said driven shaft to coact with said driven clutch members, an oscillating driving member coacting with said driving clutch members to alternately drive them in the same direction as the driving member is oscillated, an actuating lever for said driving member, a fulcrum member for said lever adjustable to regulate the stroke of said driving member, an adjusting slide on which said fulcrum member is pivotally mounted, means for adjusting said slide to and from a position in which the fulcrum member pivot is in alinement with the wrist pin of said driving crank member, and a reciprocating crosshead connected to said lever and having driving connection with said driving shaft.

10. The combination of a shaft, driven clutch members rotatable with said shaft, oppositely acting driving clutch members rotatably mounted on said driven shaft to coact with said driven clutch members, an oscillating driving member coacting with said driving clutch members to alternately drive them in the same direction as the driving member is oscillated, an actuating lever for said driving member, a fulcrum member for said lever adjustable to regulate the stroke of said driving member, an adjusting slide on which said fulcrum member is pivotally mounted, and means for adjusting said slide to and from a position in which the fulcrum member pivot is in alinement with the wrist pin of said driving crank member.

11. The combination of a longitudinally slotted actuating lever, a crank member provided with a wrist pin engaging said slot, a fulcrum member recessed to receive said lever and adjustable longitudinally thereof, an adjusting slide on which said fulcrum member is pivotally mounted, and means for adjusting said slide to and from a position in which the fulcrum member is in alinement with the wrist pin of said crank member.

12. The combination of a longitudinally slotted actuating lever, a crank member provided with a wrist pin engaging the slot in said lever, an adjustable fulcrum member for said lever, a driving shaft, and a reciprocating crosshead driven by said driving shaft and operatively connected to said lever.

13. The combination of a shaft, driven clutch members rotatable with said shaft, driving clutch members rotatably mounted on said shaft to coact with said driven clutch members and provided with oppositely acting clutch jaws and with oppositely disposed beveled gears, a pair of opposed reverse driving gears splined to said shaft for adjustment thereon, a coacting driven reversing gear mounted so that either of said reverse driving gears may be adjusted into mesh therewith, an oscillating driving member provided with a beveled gear meshing with said gears of said clutch members, an actuating lever for said driving member, and a fulcrum for said lever adjustable to regulate the stroke of said driving member.

14. In a structure of the class described, the combination of a driven shaft, driven clutch members having flanged peripheries rotatable with said shaft, driving clutch members rotatably mounted on said shaft to project within said flanges, and provided with oppositely disposed beveled gears, clutch jaws pivotally mounted on said driving clutch members in a forwardly inclined relation so that their outer ends engage the inner side of said flanges of said clutch members when the driving clutch members are rotated forwardly relative to said driven clutch members and are released when the driven clutch members are rotated forwardly relative to the driving clutch members, springs urging said jaws into engagement with the driving clutch members, and an oscillating driving member having a beveled gear coacting with the gears of said driving clutch members.

In witness whereof, I have hereunto set my hand and seal in the presence of two witnesses.

WILLIAM C. YOUNG. [L. S.]

Witnesses:
 E. E. SILVERNAIL,
 H. E. LUCAS.

Copies of this patent may be obtained for five cents each, by addressing the "Commissioner of Patents, Washington, D. C."